(12) United States Patent
Shiho et al.

(10) Patent No.: US 7,248,948 B2
(45) Date of Patent: Jul. 24, 2007

(54) APPARATUS AND METHOD FOR ESTIMATING ATTITUDE USING INERTIAL MEASUREMENT EQUIPMENT

(75) Inventors: Toru Shiho, Tokyo (JP); Ryo Ishii, Funabashi (JP); Yuichiro Sasajima, Funabashi (JP)

(73) Assignee: Nihon University, Tokyo (JP)

( * ) Notice: Subject to any disclaimer, the term of this patent is extended or adjusted under 35 U.S.C. 154(b) by 645 days.

(21) Appl. No.: 10/476,402

(22) PCT Filed: Apr. 24, 2002

(86) PCT No.: PCT/JP02/04103

§ 371 (c)(1),
(2), (4) Date: Apr. 22, 2004

(87) PCT Pub. No.: WO02/088633

PCT Pub. Date: Nov. 7, 2002

(65) Prior Publication Data

US 2004/0176881 A1    Sep. 9, 2004

(30) Foreign Application Priority Data

Apr. 25, 2001  (JP) .............................. 2001-128261

(51) Int. Cl.
*G01C 21/00* (2006.01)
(52) U.S. Cl. .............................. 701/4; 701/13; 701/220; 244/171
(58) Field of Classification Search .................... 701/3, 701/4, 13, 207, 220; 702/150, 152, 153; 244/164, 171

See application file for complete search history.

(56) References Cited

U.S. PATENT DOCUMENTS

| 5,543,804 | A | * | 8/1996 | Buchler et al. | ........ | 342/357.08 |
| 5,757,316 | A | * | 5/1998 | Buchler | ................. | 342/357.11 |
| 6,205,400 | B1 | * | 3/2001 | Lin | ............................. | 701/214 |
| 6,272,432 | B1 | * | 8/2001 | Li et al. | ...................... | 701/222 |

(Continued)

FOREIGN PATENT DOCUMENTS

JP    6-229772    8/1994

(Continued)

*Primary Examiner*—Gary Chin
(74) *Attorney, Agent, or Firm*—Wells St. John.

(57) ABSTRACT

An apparatus for estimating attitude using an inertia measuring apparatus comprising: a Kalman filter 3 adapted to receive a quantity of state ω(t) from the inertia measuring apparatus 1, input the quantity of state into a predetermined system equation and a predetermined observation equation and execute time update processing and observation update processing with regard to the system equation and the observation equation; a processing section 4 adapted to generate an estimated value of a time differentiation of a modified Rodrigues parameter α(t) based upon an output of the Kalman filter; an integral processing section 5 adapted to generate an estimated value of the modified Rodrigues parameter based upon an output of the processing section; a system propagation matrix generating section 6 adapted to update an observation sensitivity matrix based upon an initial value being given beforehand and an output of the integral processing section and supply the updated output to the Kalman filter; a transformed matrix generating section 7 adapted to generate a coordinate transformation matrix R based upon an output of the integral processing section; and an attitude estimation section 8 adapted to carry out an attitude estimation based upon an output of the transformed matrix generating section, is disclosed.

12 Claims, 3 Drawing Sheets

U.S. PATENT DOCUMENTS

| | | | |
|---|---|---|---|
| 6,298,288 B1 * | 10/2001 | Li et al. | 701/13 |
| 6,424,914 B1 * | 7/2002 | Lin | 701/214 |
| 6,424,915 B1 * | 7/2002 | Fukuda et al. | 701/214 |
| 6,496,778 B1 * | 12/2002 | Lin | 701/215 |
| 6,516,272 B2 * | 2/2003 | Lin | 701/214 |
| 7,076,342 B2 * | 7/2006 | Fukuda et al. | 701/4 |
| 7,193,559 B2 * | 3/2007 | Ford et al. | 342/357.14 |

FOREIGN PATENT DOCUMENTS

| | | |
|---|---|---|
| JP | 9-14962 | 1/1997 |
| JP | 11-129997 | 5/1999 |

* cited by examiner

APPARATUS AND METHOD FOR ESTIMATING ATTITUDE USING INERTIAL MEASUREMENT EQUIPMENT

CROSS REFERENCE TO RELATED APPLICATION

This application is a 35 U.S.C. §371 of and claims priority to PCT International Application Number PCT/JP02/04103, which was filed 24 Apr. 2002 (24.04.02), and was published in Japanese which was based on Japanese Patent Application No. 2001-128261 which was filed 24 Apr. 2001 (25.04.01) and the teachings of which are incorporated herein by reference.

FIELD OF THE INVENTION

The present invention relates to an apparatus for estimating attitude, which, for example, estimates the attitude of an artificial satellite based upon signals from an inertia measuring apparatus, and to a method for estimating the attitude and a program for the same.

BACKGROUND ART

In recent years, in the field of space development, attentions have been paid to a microsat (micro-miniaturized artificial satellite), which is monofunctional but can be developed easily, in addition to big and multi-functional artificial satellites. It is considered that easiness in the development of such microsat can reduce the cost per unit of an artificial satellite and also renders the space development more familiar. At present, a great number of microsats have been launched as piggyback satellites.

The merits of the microsat are the features of monofunctional and low cost. However, in order to provide the microsat with high performance, it is essential for the satellite to be equipped with three axial control mechanism. Because of that, an attitude observation system with high performance is required. However, considering the increase in the developmental cost for the satellite, it is not possible to use such a expensive hardware.

Conventionally, various types of sensors have been used as an attitude sensor for the three axial satellites. For example, it has been known that exact attitude estimation including rolls and yaws can be done by detecting an attitude angular velocity from a gyro, such as an inertia reference apparatus, and then integrating the attitude angular velocity. The inertia reference apparatus is an apparatus which is mounted with a rate gyro or the like in the three axial manner and packaged together. When directly integrating signals of the gyro and then using them, there is a merit for obtaining dynamical and good responsive detection. Then again, there is a demerit of accumulation of drifts during a long run. In order to compensate such accumulation of drifts, a manner of rendering feedback of the errors using a star tracker from the absolute reference to the detection system has been employed. However, because this manner requires expensive sensors, it is not possible to apply it to a microsat that is monofunctional and is required to be low cost.

The present invention was made for aiming at achieving the above-mentioned object, and it is an object of the present invention to provide an attitude estimation apparatus being provided with high accuracy and inexpensive and a method for estimating attitude, i.e., an attitude estimation apparatus using an inertia measuring apparatus and being capable of estimating the attitude of an artificial satellite by means of hardware, such as a piezoelectric vibration gyro and a fiber gyro, of which cost per unit is relatively low, and a method and a program for estimating the attitude.

With the present invention, it becomes possible to estimate the attitude only with information from the gyro without requiring sensors such as a star tracker. The conventional artificial satellites may face such a circumstance where they cannot use the sensors. For example, the present invention can be a countermeasure under a practical operation when an artificial satellite cannot use a sensor such as a star tracker in the maneuver.

DISCLOSURE OF THE INVENTION

The attitude estimation apparatus using an inertia measuring apparatus according to the present invention comprises:

a Kalman filter adapted to receive a quantity of state $\omega(t)$ from the inertia measuring apparatus to input it into a predetermined system equation and observation equation and execute time update processing and observation update processing with regard to the equations, a processing section adapted to generate an estimated value of a time differentiation of a modified Rodrigues parameter $\alpha(t)$ based upon an output of the Kalman filter, an integral processing section adapted to generate an estimated value of a modified Rodrigues parameter based upon an output of the processing section, a system propagation matrix generating section adapted to update an observation sensitivity matrix based upon an initial value given beforehand and an output of the integral processing section, and supply the updated output to the Kalman filter, a transformed matrix generating section adapted to generate a coordinate transformation matrix R based upon an output of the integral processing section, and an attitude estimation section adapted to execute attitude estimation based upon an output of the transformed matrix generating section.

The modified Rodrigues parameter is preferably given according to equations (2.2.31) and (2.2.32) described later wherein e is a directional cosine of a rotative axis and $\theta$ is a rotation angle about the rotative axis.

When an equation (2.3.1) described later is provided, the observation equation is preferably given by adding observation noises into an equation (2.3.2).

When the right member of an equation (2.3.5) described later is set to be $f(\alpha(t), \dot{\alpha}(t), t)$, the system equation is preferably given by adding system noises into an equation (2.3.6) described later.

The method for estimating attitude according to the present invention, wherein an inertia measuring apparatus is used, comprises:

first step for receiving signals from the inertia measuring apparatus and generating a system equation and an observation equation, wherein a quantity of state of a time differentiation of a modified Rodrigues parameter $\alpha(t)$ and a quantity of state $\omega(t)$ are quantities to be observed, second step for obtaining an estimated value of a time differentiation of the parameter $\alpha(t)$ by means of an extended Kalman filter, third step for numerically integrating the estimated value obtained in the second step and obtaining an estimated value of the parameter $\alpha(t)$, fourth step for determining a transformed matrix $R(t)$ based upon the estimated value obtained in the third step, and a step for obtaining an estimated value of the attitude based upon the transformed matrix R(t).

The program according to the present invention is to render a computer to execute:

first step for receiving signals from the inertia measuring apparatus and generating a system equation and an observation equation, in those which a quantity of state of a time differentiation of a modified Rodrigues parameter α(t) and a quantity of state ω(t) are quantities to be observed, second step for obtaining an estimated value of a time differentiation of the parameter α(t) by means of an extended Kalman filter, third step for numerically integrating the estimated value obtained in the second step to obtain an estimated value of the parameter α(t), fourth step for determining the transformed matrix R(t) based upon the estimated value obtained in the third step, and a step for obtaining an estimated value of the attitude based upon the transformed matrix R(t).

The program according to the present invention is recorded in, for example, a recording medium.

The recoding medium includes, for example, a flexible disk, a hard disk, a magnetic tape, a magnet-optical disk, a CD (including CD-ROM, Video-CD), a DVD (including DVD-Video, DVD-ROM, DVD-RAM), a ROM-cartridge, a RAM memory cartridge equipped with battery backup, a flash memory cartridge, a nonvolatile RAM cartridge, and the like.

Furthermore, the recording medium also includes communication media, such as a cable communication medium, e.g., telephone lines, and a wireless communication medium, e.g., microwave lines. Internet is also included in the communication media defined herein.

The medium is defined as an object in which information (mainly digital data and programs) are recorded by means of certain physical means and capable of rendering a processing device, such as a computer and a dedicated processor, to execute a preset function. In short, any material can be the medium as far as it can execute downloading of a program into a computer by any means and it can render the computer to implement the program.

The present invention is constituted by applying the modified Rodrigues parameter to the extended Kalman filter.

In general, a conversion equation using quaternions is known as a propagation equation of an attitude. In case of the quaternions, there are such advantages that no specific point with respect to the attitude exists and no transcendental function is used, which are unlike the Euler angles. Thus, the quaternions are generally used for describing the attitude of a satellite. However, when the quaternions are estimated with respect to information only from a gyro, a required observation equation is not established in the Kalman filter that is an estimation algorithm. In order to carry out the estimation by means of the Kalman filter, it is required to establish required equations, i.e., a system equation and an observation equation. Hence, in the present invention, it has become possible to establish those equations by using the modified Rodrigues parameter that is an application of the quaternions.

BEST MODE FOR CARRYING OUT THE INVENTION

Now, the apparatus and the method according to embodiments for carrying out the present invention are explained with reference to the appended drawings. The explanation in the following is an example where the apparatus and the method according to embodiments for the present invention are used for estimating an attitude. The apparatus and the method according to embodiments for the present invention are intended to carry out estimation of the attitude information of an artificial satellite for long run with high accuracy based upon only an output from a gyro serving as a sensor. In the present invention, modified Rodrigues parameters are used as the attitude determination equation of an artificial satellite.

Figure 1:
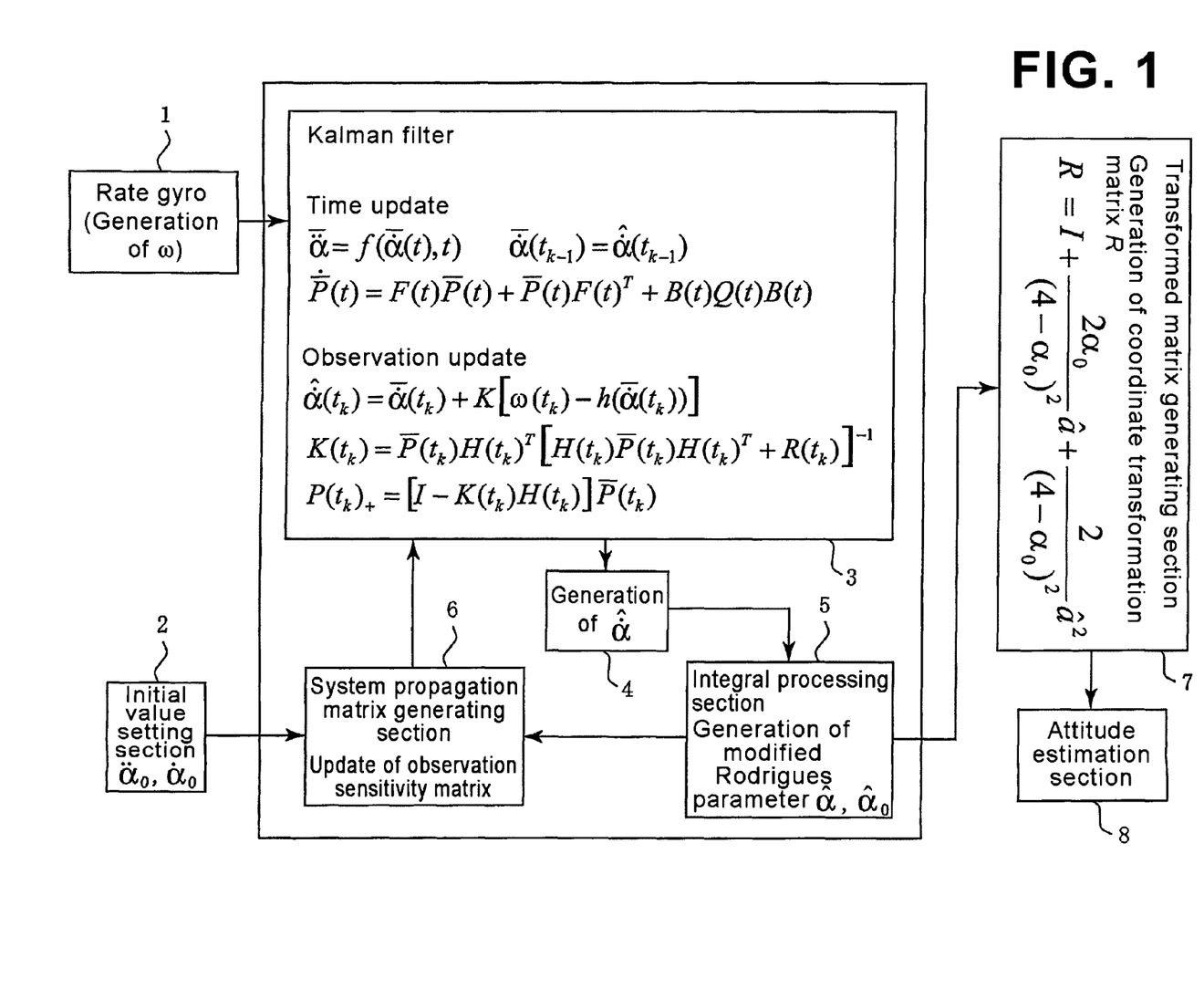
FIG. 1 is a block diagram showing the apparatus according to one embodiment for carrying out the present invention.

FIG. 1 is a block diagram showing the apparatus according to one embodiment for the present invention. The apparatus receives a quantity of state (angular velocity) ω(t) from a rate gyro serving as an inertia measuring apparatus, and Kalman filter 3 generates a system equation and an observation equation and executes time update processing and observation update processing according to the following equations. Besides, the details of the system equation and the observation equation will be explained later.

Time Update $$\dot{\bar{\alpha}} = f(\bar{\alpha}(t), t) \bar{\alpha}(t_{k-1}) = \hat{\alpha}(t_{k-1})$$

$$\dot{\bar{P}}(t) = F(t)\bar{P}(t) + \bar{P}(t)F(t)^T + B(t)Q(t)B(t)$$

Observation Update $$\hat{\alpha}(t_k) = \bar{\alpha}(t_k) + K[\omega(t_k) - h(\bar{\alpha}(t_k))]$$

$$K(t_k) = \bar{P}(t_k)H(t_k)^T[H(t_k)\bar{P}(t_k)H(t_k)^T + R(t_k)]^{-1}$$

$$P(t_k)_+ = [I - K(t_k)H(t_k)]\bar{P}(t_k)$$

In the above equations, a mark + shown with a subscript letter represents a variable after the observation update processing carried out by the Kalman filter. Similarly, k shown with a subscript letter represents that implementation of an expression which is discretely processed at an interval Δt is the k-th in the order, and k+1 represents that the implementation is the k+1-th in the order. A negative numeral of −1 shown with a superscript letter represents an inverse matrix. T shown with a superscript letter represents a transposed matrix.

Now, brief explanation will be made about the time update and the observation update. The time update is defined as a processing to integrate a linear model expressed in the following equation.

$$\dot{x}(t) = F(t)x(t) + B(t)u(t)$$

In the above-described case, the time update is a processing to integrate the following equation.

$$\ddot{\alpha} = F(t)\dot{\alpha} + B(t)u(t)$$

This is a processing to obtain a predicted value by conducting calculation. In addition, a covariance matrix of errors is simultaneously updated. The equation with regard to the covariance matrix of errors is expressed as the following equation.

$$\dot{\overline{P}}(t)=F(t)\overline{P}(t)+\overline{P}(t)F(t)^T+B(t)Q(t)B(t)^T$$

When conducting the update processing, this equation is subjected to integral processing. As a result, $\overline{P}(t)$ is worked out.

The observation update is defined as a processing to work out a new estimated value based on an observed value and a predicted value by conducting calculation, those which are newly obtained. In the above-described case, the equation is expressed as follows.

$$\hat{\alpha}(t_k)_+ = \overline{\hat{\alpha}}(t_k)+K(t_k)[\omega(t_k)-H(t_k)\overline{\hat{\alpha}}(t_k)]$$

The component attached with a hat represents an estimated value, and the component with a bar represents a predicted value. In this processing, information with regard to errors is obtained by comparing an observed value and a predicted value, the information is then multiplied by a certain gain to add the multiplied information to the predicted value, and the predicted value having been added is used as the estimated value. Particularly, the part of $$\omega(t_k)-H(t_k)\overline{\hat{\alpha}}(t_k)$$

is called as innovation process or O-C, which is a process to compare the observed value with the observed value predicted by conducting calculation. With the process, a comparison is made to see if the predicted value by conducting calculation and the observed value differ with each other or not. Information as regard to errors is obtained from the comparison, however, the information includes both useful information and meaningless information. So-called Kalman gain expressed with $$K(t_k)$$

is for determining how to divide such information and add the divided information to the predicted value.

The Kalman gain is worked out according to the following equation.

$$K(t_k)=\overline{P}(t_k)H(t_k)^T[H(t_k)\overline{P}(t_k)H(t_k)^T+R(t_k)]^{-1}$$

(For conducting calculation according to the above equation, it was required to determine $\overline{P}(t)$ by means of the time update.) Besides, $R(t_k)$ is one called as a covariance matrix of the observation noises.

Further, the covariance matrix of errors is also updated with the Kalman gain, the update is carried out according to the following equation.

$$P(t_k)_+ = [I-K(t_k)H(t_k)]\overline{P}(t_k)$$

The "time update" and "observation update" those which execute the processings as described above are used to estimate the quantity of state, such as "position" and "attitude", by the time update during the time after executing the observation update with a new observed value until obtaining a new observed value.

A processing section 4 generates $\hat{\dot{\alpha}}$ (an estimated value of a time differentiation $\dot{\alpha}(t)$ of a modified Rodrigues parameter $\alpha(t)$) based upon an output of the Kalman filter 3.

An integral processing section 5 generates estimated values $\hat{\alpha}$, $\hat{\alpha}_0$ of the modified Rodrigues parameter based upon an output of the processing section 4.

A system propagation matrix generating section 6 updates an observation sensitivity matrix based upon an output of an initial value setting section 2 and an output of the integral processing section 5 and supplies the updated output to the Kalman filter 3. The system propagation matrix is F(t) in a linear system expressed as an equation as follows.

$$\dot{x}(t)=F(t)x(t)+B(t)u(t) \text{ (In this case:} \ddot{\alpha}=F(t)\dot{\alpha}+B(t)u(t))$$

In this case, the system propagation matrix is obtained by subjecting the quantity of state $\dot{\alpha}$ of an equation (2.3.5) described later to a partial differentiation (equations (2.3.8) to (2.3.16) described later correspond to the components). The system propagation matrix is a matrix representing a relation between the quantity of state and a differentiated value of the quantity of state. The observation sensitivity matrix is H(t) expressed in the following equation.

$$\omega(t)=H(t)\dot{\alpha}(t)+v(t)$$

The observation sensitivity matrix is a matrix representing a relation between an observed value and the quantity of state (The matrix is obtained from an equation (2.3.1) described later. However, since this value cannot be solved holomorphically, it is subjected to a numerical operation processing).

The transformed matrix generating section 7 generates a coordinate transformation matrix R based on an output of the integral processing section 5.

The attitude estimation section 8 executes attitude estimation based upon an output of the transformed matrix generating section 7.

Now, the operation will be explained. The outline of the processings in the present invention will be explained first, the theoretics and the details of algorithm of the present invention will be then explained, and the result of simulation will be finally explained.

In an embodiment for carrying out the present invention, a known extended Kalman filter is used. The Kalman filter is a manner where an initial value of a desired quantity of state is previously given and estimated values of the quantity of state are sequentially calculated based upon the initial value and the time record of the quantity of observation.

Figure 2:
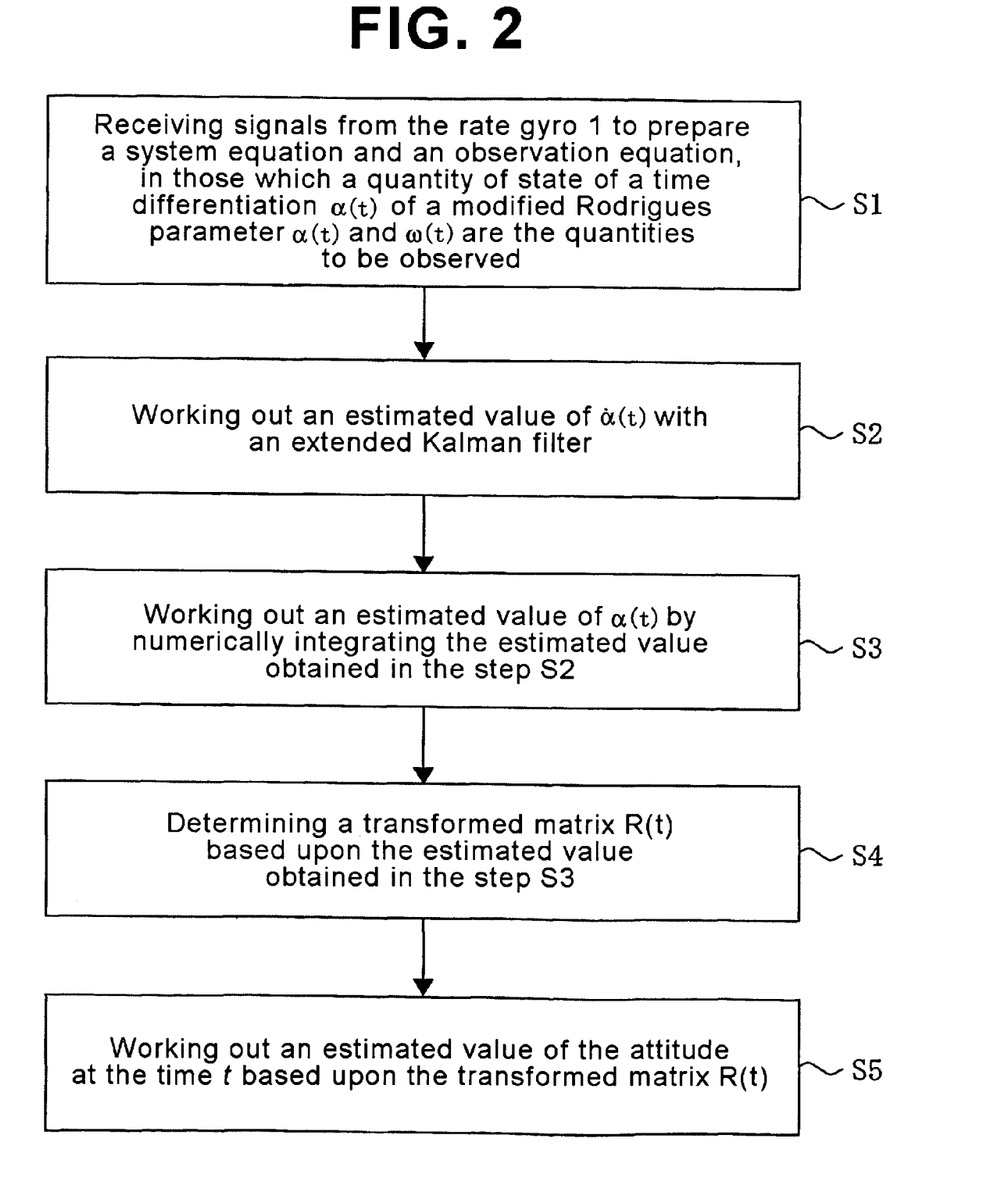
FIG. 2 is a flow chart showing the processing according to one embodiment for carrying out the present invention.

FIG. 2 shows an outlined flow chart of the operation.

S1: Preparing a system equation and an observation equation by receiving signals from a rate gyro 1, in those which a quantity of state of a time differentiation $\dot{\alpha}(t)$ of a modified Rodrigues parameter $\alpha(t)$ and $\omega(t)$ are the quantities to be observed.

S2: Working out an estimated value of $\dot{\alpha}(t)$ with the extended Kalman filter.

S3: Working out an estimated value of $\alpha(t)$ by numerically integrating the estimated value obtained in the step S2.

S4: Determining the transformed matrix R(t) based upon the estimated value obtained in the step S3.

S5: Working out an estimated value of the attitude at the time t based upon the transformed matrix R(t).

As described above, the system equation and the observation equation can be generated by using the modified Rodrigues parameter, and it became possible to apply the extended Kalman filter for the attitude estimation of an artificial satellite. As a result, the influence caused by drifts was reduced, and it became possible to carry out the attitude estimation with high accuracy by means of only the rate gyro. Inversely, it was not possible to generate the system equation and the observation equation by the conventional manners, and the extended Kalman filter could not be applied to the attitude estimation of an artificial satellite.

Now, explanation will be made on the theoretics.

[Theoretics]

1. Rotation of Vectors About an Arbitrary Axis

Now, assuming that a certain vector is rotated through angle θ about an arbitrary axis. Here, a unit vector in the axial direction is designated by e, and the vector after the rotation is designated by x'. In that case, the following equation becomes valid.

$$x'=(x \cdot e)e+\{x-(x \cdot e)e\}\cos\theta+(e\times x)\sin\theta \quad (2.1.1a)$$

$$=(x \cdot e)e-x+x+\{x-(x \cdot e)e\}\cos\theta+\sin\theta(e\times x)$$

$$=x+(1-\cos\theta)\{(x \cdot e)e-x\}+\sin\theta(e\times x)$$

$$=x+(1-\cos\theta)\{(x \cdot e)-(e \cdot e)x\}+\sin\theta(e\times x)$$

$$=x+(1-\cos\theta)e\times e\times x+\sin\theta(e\times x)$$

$$=\{I+\sin\theta\hat{e}+(1-\cos\theta)\hat{e}^2\}x \quad (2.1.1b)$$

wherein I represents a unit matrix. Further, under the following conditions, $$\hat{e} = \begin{bmatrix} 0 & -e_z & e_y \\ e_z & 0 & -e_x \\ -e_y & e_x & 0 \end{bmatrix} \quad (2.1.2a)$$

$$\hat{e}x = e \times x \quad (2.1.2b)$$

the following equation becomes valid based on the formulae of double angles and half angles.

$$x' = \left\{ I + 2\cos\frac{\theta}{2}\sin\frac{\theta}{2}\hat{e} + 2\sin\frac{\theta}{2}\hat{e} \cdot \sin\frac{\theta}{2}\hat{e} \right\} x \quad (2.1.3)$$

Here, if the quaternion q that represents the rotation of an arbitrary axial rotation θ is expressed as follows, $$q = \left( \cos\frac{\theta}{2}, \sin\frac{\theta}{2}e \right) \quad (2.1.4a)$$

$$=(\alpha, V) \quad (2.1.4b)$$

x' is expressed as follows.

$$x'=\{I+2\alpha\hat{V}+2\hat{V}^2\}x=Rx \quad (2.1.5)$$

However, in the above equation, the following equations are valid.

$$\hat{V} = \begin{bmatrix} 0 & -v_z & v_y \\ v_z & 0 & -v_x \\ -v_y & v_x & 0 \end{bmatrix} \quad (2.1.6)$$

$$R = \{I + 2\alpha\hat{V} + 2\hat{V}^2\}$$

Hence, if the direction of the axis at the time to and the transformed matrix R at the time t are known, the direction of the axis at the time t, namely the attitude, can be known.

2. System Equation

If basis vectors in tridimensional space are $c_1$, $C_2$, $C_3$, and when these three vectors rotate about the axis that is expressed with a certain angular velocity vector shown in the following, $$\omega = \begin{bmatrix} \omega_1 \\ \omega_2 \\ \omega_3 \end{bmatrix} \quad (2.2.1)$$

$$\omega = \omega_1 c_1 + \omega_2 c_2 + \omega_3 c_3 \quad (2.2.2)$$

the following relation comes to valid with respect to the time integrations of $c_1$, $c_2$, and $c_3$.

$$\begin{cases} \dot{c}_1 = \omega \times c_1 \\ \dot{c}_2 = \omega \times c_2 \\ \dot{c}_3 = \omega \times c_3 \end{cases} \quad (2.2.3)$$

When the equation (2.2.2) is collected into one equation by using matrix expression and using $\hat{\omega}$ indicated as follows, $$\hat{\omega} = \begin{bmatrix} 0 & -\omega_3 & \omega_2 \\ \omega_3 & 0 & -\omega_1 \\ -\omega_2 & \omega_1 & 0 \end{bmatrix} \quad (2.2.4)$$

the equation comes to an equation as follows.

$$\dot{c} = c\hat{\omega} \quad (2.2.5)$$

wherein, $$c=[c_1|c_2|c_3] \quad (2.2.6)$$

$$c\hat{\omega}=[\omega \times c_1|\omega \times c_2|\omega \times c_3] \quad (2.2.7)$$

3. Use of Modified Rodrigues Parameter and Its First-Order Differential Equation Modified Rodrigues parameter: α and $\alpha_0$ as shown below are defined as follows.

$$a \equiv 4\tan\frac{\theta}{4}e = \begin{bmatrix} \alpha_x \\ \alpha_y \\ \alpha_z \end{bmatrix} \quad (2.2.31)$$

$$\alpha_0 \equiv 2 - \frac{a^2}{8} \quad (2.2.32)$$

That is, α is a tridimensional vector. e represents a directional cosine of the rotative axis, and θ represents a rotation angle about the rotative axis. If the modified Rodrigues parameter defined according to the equation (2.2.31) is used, the element of the quaternion in the equation (2.1.4) can be expressed with α. If a and V expressed with α are used, the transformed matrix of the equation (2.1.5) can be expressed with α.

Further, the time history of R can be worked out by preparing the first-order differential equation of α. The first-order differential equation of α is merely three simultaneous equations.

From the equation (2.2.32), a is worked out as follows.

$$a^2 = 16 - 8\alpha_0 \quad (2.2.33)$$

$$a = \cos\frac{\theta}{2} = 2\cos^2\frac{\theta}{4} - 1$$

$$= \frac{2}{1+\tan^2\frac{\theta}{4}} - 1$$

$$= \frac{2}{1+\frac{a^2}{16}} - 1 = \frac{32}{16+a^2} - 1 = \frac{32}{16+16-8\alpha_0} - 1$$

$$= \frac{4}{4-\alpha_0} - 1$$

Hence, the following equation comes valid.

$$a = \frac{\alpha_0}{4-\alpha_0} \quad (2.2.34)$$

Next, attention is paid to V. V is worked out according to the following equation.

$$V = \sin\frac{\theta}{2} e = \frac{4\tan\frac{\theta}{4}}{4-\alpha_0} e = \frac{a}{4-\alpha_0} \quad (2.2.35)$$

The transformed matrix R is worked out according to the following equations based on the equations (2.2.34) and (2.2.35).

$$R = I + 2a\hat{V} + 2\hat{V}^2 \quad (2.2.36)$$

$$= I + \frac{2\alpha_0}{4-\alpha_0} \cdot \frac{\hat{a}}{4-\alpha_0} + \frac{2\hat{a}^2}{(4-\alpha_0)^2}$$

$$= I + \frac{2\alpha_0}{(4-\alpha_0)^2}\hat{a} + \frac{2}{(4-\alpha_0)^2}\hat{a}^2$$

If working out the first-order differential equation of a using the equations (2.2.34) and (2.2.35), the following equation comes valid.

$$\dot{a} = \left(\frac{\alpha_0}{2}I + \frac{1}{2}\hat{a} + \frac{1}{8}aa^T\right)\omega \quad (2.2.41)$$

$$= \frac{1}{8}\left\{\begin{bmatrix} 4\alpha_0 & 0 & 0 \\ 0 & 4\alpha_0 & 0 \\ 0 & 0 & 4\alpha_0 \end{bmatrix} + \begin{bmatrix} 0 & -\alpha_z & \alpha_y \\ 4\alpha_z & 0 & -\alpha_x \\ -4\alpha_2 & 4\alpha_x & 0 \end{bmatrix} + \begin{bmatrix} \alpha_x \\ \alpha_y \\ \alpha_z \end{bmatrix}\begin{bmatrix} \alpha_x & \alpha_y & \alpha_z \end{bmatrix}\right\}\omega$$

$$= \frac{1}{8}\left\{\begin{bmatrix} 4\alpha_0 & -4\alpha_z & 4\alpha_y \\ 4\alpha_z & 4\alpha_0 & -4\alpha_x \\ -4\alpha_y & 4\alpha_x & 4\alpha_0 \end{bmatrix} + \begin{bmatrix} \alpha_x^2 & \alpha_x\alpha_y & \alpha_x\alpha_z \\ \alpha_x\alpha_y & \alpha_y^2 & \alpha_y\alpha_z \\ \alpha_x\alpha_z & \alpha_y\alpha_z & \alpha_z^2 \end{bmatrix}\right\}\omega$$

$$\therefore \dot{a} = \frac{1}{8}\begin{bmatrix} 4\alpha_0+\alpha_x^2 & -4\alpha_z+\alpha_x\alpha_y & 4\alpha_y+\alpha_x\alpha_z \\ 4\alpha_z+\alpha_x\alpha_y & 4\alpha_0+\alpha_y^2 & -4\alpha_x+\alpha_y\alpha_z \\ -4\alpha_y+\alpha_x\alpha_z & 4\alpha_x+\alpha_y\alpha_z & 4\alpha_0+\alpha_z^2 \end{bmatrix}\omega$$

[Details of Algorithm]

4. Application to Extended Kalman Filter

In an embodiment for the present invention, the attitude estimation is carried out based on the angular velocity vector ω(t) measured from the rate gyro which is mounted to three axes being perpendicular to one another in a satellite.

More particularly, the quantity of state of the time differentiation $\dot{\alpha}(t)$ of a modified Rodrigues parameter α(t), and the system equation and the observation equation in those which ω(t) is the quantity of observation are prepared from the equation (2.2.41), and the estimated value of $\dot{\alpha}(t)$ is worked out with the extended Kalman filter. Then, the obtained estimated value is numerically integrated to obtain the estimated value of α(t), which is then substituted into the equation (2.2.36) to determine the transformed matrix R(t), and the estimated value of the attitude at the time t is worked out according to the equation (2.1.5).

In this case, x in the right member of the equation (2.1.5) is the initial value of the directional vector that represents an arbitrary fixed axis of an artificial satellite, and x' in the left member becomes the direction of the fixed axis after t seconds. The norms of x' and x are equivalent.

In the first place, the observation equation is worked out. If set as follows based on the equation (2.2.41), $$H^{-1} = \begin{bmatrix} 4\alpha_0+\alpha_x^2 & -4\alpha_z+\alpha_x\alpha_y & 4\alpha_y+\alpha_x\alpha_z \\ 4\alpha_z+\alpha_x\alpha_y & 4\alpha_0+\alpha_y^2 & -4\alpha_x+\alpha_y\alpha_z \\ -4\alpha_y+\alpha_x\alpha_z & 4\alpha_x+\alpha_y\alpha_z & 4\alpha_0+\alpha_z^2 \end{bmatrix} \quad (2.3.1)$$

the following equation becomes valid.

$$\omega = H\dot{\alpha} \quad (2.3.2)$$

By adding the observation noises to the equation (2.3.2), the observation equation in the extended Kalman filter is obtained.

Now, the system equation will be worked out. The following equation is obtained from the equation (2.2.32).

$$\dot{\alpha}_0 = -\frac{1}{4}(a \cdot \dot{a}) = -\frac{1}{4}(\alpha_x\dot{\alpha}_x + \alpha_y\dot{\alpha}_y + \alpha_z\dot{\alpha}_z) \quad (2.3.3)$$

When developing the equation (2.2.41), the following equation comes valid.

$$\dot{a} = \frac{1}{8}\begin{bmatrix} (4\alpha_0+\alpha_x^2)\omega_x + (-4\alpha_z+\alpha_x\alpha_y)\omega_y + (4\alpha_y+\alpha_x\alpha_z)\omega_z \\ (4\alpha_z+\alpha_x\alpha_y)\omega_x + (4\alpha_0+\alpha_y^2)\omega_y + (-4\alpha_x+\alpha_y\alpha_z)\omega_z \\ (-4\alpha_y+\alpha_x\alpha_z)\omega_x + (4\alpha_x+\alpha_y\alpha_z)\omega_y + (4\alpha_0+\alpha_z^2)\omega_z \end{bmatrix} \quad (2.3.4)$$

If considering that the time differentiation dω/dt of ω is meaningless and deleting it, the first-order differentiation of the equation (2.3.4) comes to as follows.

$$\ddot{a} = \frac{1}{8} \begin{bmatrix} (\alpha_x\dot{\alpha}_x - \alpha_y\dot{\alpha}_y - \alpha_z\dot{\alpha}_z)\omega_x + (-4\dot{\alpha}_z + \dot{\alpha}_x\alpha_y + \alpha_x\dot{\alpha}_y)\omega_y + (4\dot{\alpha}_y + \dot{\alpha}_x\alpha_z + \alpha_x\dot{\alpha}_z)\omega_z \\ (4\dot{\alpha}_z + \dot{\alpha}_x\alpha_y + \alpha_x\dot{\alpha}_y)\omega_x + (-\alpha_x\dot{\alpha}_x + \alpha_y\dot{\alpha}_y - \alpha_z\dot{\alpha}_z)\omega_y + (-4\dot{\alpha}_x + \dot{\alpha}_y\alpha_z + \alpha_y\dot{\alpha}_z)\omega_z \\ (-4\dot{\alpha}_y + \dot{\alpha}_x\alpha_z + \alpha_x\dot{\alpha}_z)\omega_x + (4\dot{\alpha}_x + \dot{\alpha}_y\alpha_z + \alpha_y\dot{\alpha}_z)\omega_y + (-\alpha_x\dot{\alpha}_x - \alpha_y\dot{\alpha}_y + \alpha_z\dot{\alpha}_z)\omega_z \end{bmatrix} \quad (2.3.5)$$

If the right member of the above equation is $f(\alpha(t),\dot{\alpha}(t),t)$, the following equation comes valid.

$$\ddot{a}(t) = f(a(t), \dot{a}(t), t) = \begin{bmatrix} f_x \\ f_y \\ f_z \end{bmatrix} \quad (2.3.6)$$

By adding the system noises to the equation (2.3.6), the equation becomes a system equation in the extended Kalman filter.

Since the equation (2.3.6) is a nonlinear differential equation, it is required to work out a matrix F which is obtained by partially differentiating the equation (2.3.5) by the quantity-of-state vector in order to work out the system propagation matrix.

$$F = \left[\frac{\partial f}{\partial \dot{a}}\right] = \begin{bmatrix} \partial f_x/\partial \dot{\alpha}_x & \partial f_x/\partial \dot{\alpha}_y & \partial f_x/\partial \dot{\alpha}_z \\ \partial f_y/\partial \dot{\alpha}_x & \partial f_y/\partial \dot{\alpha}_y & \partial f_y/\partial \dot{\alpha}_z \\ \partial f_z/\partial \dot{\alpha}_x & \partial f_z/\partial \dot{\alpha}_y & \partial f_z/\partial \dot{\alpha}_z \end{bmatrix} \quad (2.3.7)$$

From the equation (2.3.5), each of the elements of F is obtained as follows.

$$\frac{\partial f_x}{\partial \dot{\alpha}_x} = (\alpha_x\omega_x + \alpha_y\omega_y + \alpha_z\omega_z)/8 \quad (2.3.8)$$

$$\frac{\partial f_x}{\partial \dot{\alpha}_y} = (-\alpha_y\omega_x + \alpha_x\omega_y + 4\omega_z)/8 \quad (2.3.9)$$

$$\frac{\partial f_x}{\partial \dot{\alpha}_z} = (-\alpha_z\omega_x - 4\omega_y + \alpha_x\omega_z)/8 \quad (2.3.10)$$

$$\frac{\partial f_y}{\partial \dot{\alpha}_x} = (\alpha_y\omega_x - \alpha_x\omega_y - 4\omega_z)/8 \quad (2.3.11)$$

$$\frac{\partial f_y}{\partial \dot{\alpha}_y} = (\alpha_x\omega_x + \alpha_y\omega_y + \alpha_z\omega_z)/8 \quad (2.3.12)$$

$$\frac{\partial f_y}{\partial \dot{\alpha}_z} = (4\omega_x - \alpha_z\omega_y + \alpha_y\omega_z)/8 \quad (2.3.13)$$

$$\frac{\partial f_z}{\partial \dot{\alpha}_x} = (\alpha_z\omega_x + 4\omega_y - \alpha_x\omega_z)/8 \quad (2.3.14)$$

$$\frac{\partial f_z}{\partial \dot{\alpha}_y} = (-4\omega_x + \alpha_z\omega_y - \alpha_y\omega_z)/8 \quad (2.3.15)$$

$$\frac{\partial f_z}{\partial \dot{\alpha}_z} = (\alpha_x\omega_x + \alpha_y\omega_y + \alpha_z\omega_z)/8 \quad (2.3.16)$$

[Simulation Result]

Figure 3:
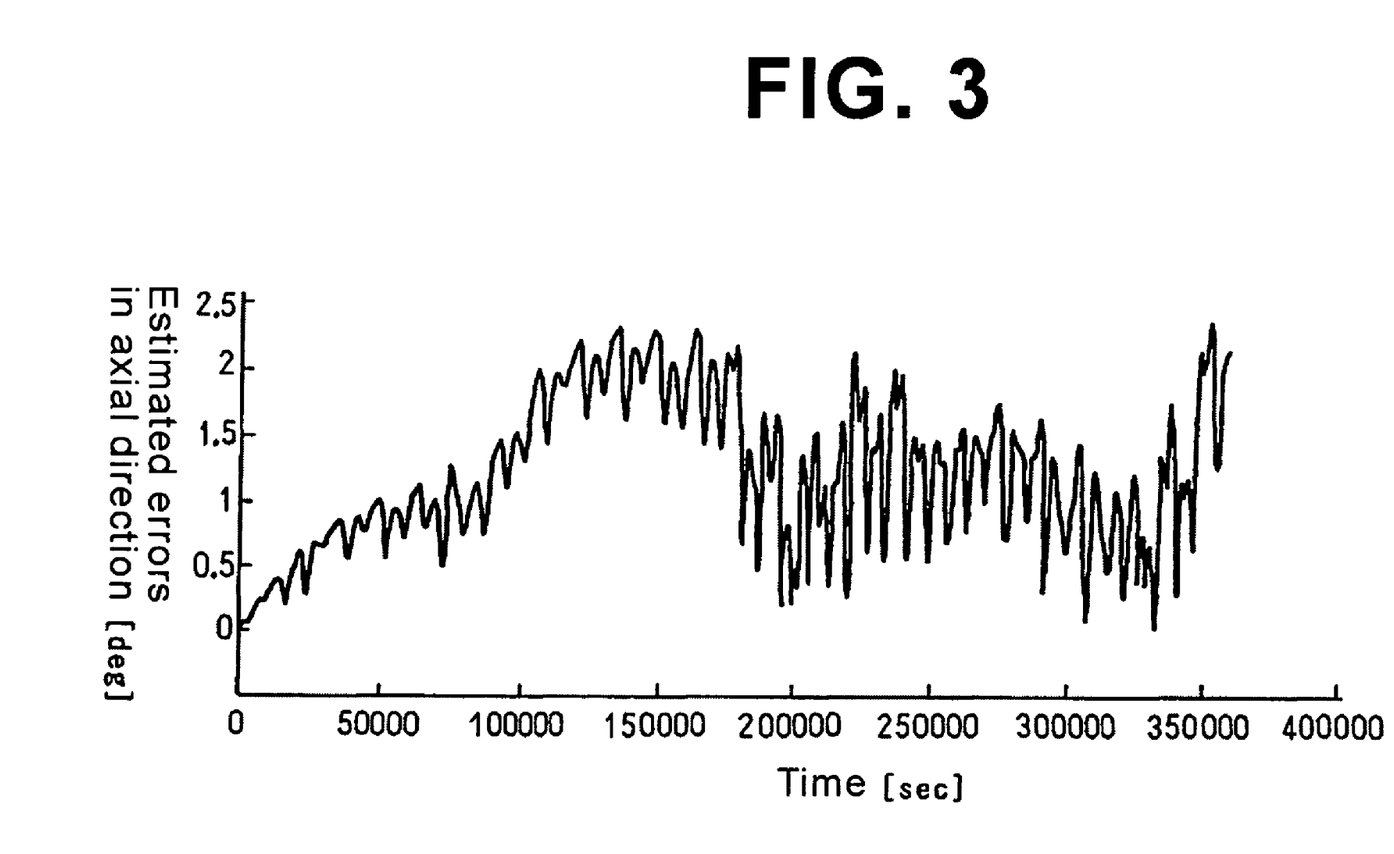
FIG. 3 shows an example of a result of simulation.

The result of simulation is shown in FIG. 3. FIG. 3 shows estimated errors in the direction of the apparatus body axis when the standard deviation of observation noises is equal to $3\times10^{-5}$ [rad/sec]. According to FIG. 3, the errors increase in proportion to time in the initial stage and reach 2.2 [deg] at $1.2\times10^5$ [sec]. However, the errors are then stabilized. According to the embodiment for the present invention, the Kalman gain has converged soon. Hence, reconstruction of information can be implemented in a good condition.

Moreover, as evident from FIG. 3, there is no accumulation of the drifts and the errors can be settled within a certain range in the embodiment for the present invention. Contrary thereto, according to the conventional techniques, the drifts accumulate and the errors have never be settled within a certain range. In this concern, the technique of the embodiment for the present invention is excellently improved.

The present invention can be modified in various ways within a scope described in the claims without being limited to the range of the embodiment described above. It is no need to say that such modifications of the present invention also fall within the scope of the present invention.

The present invention can be applied not only to an artificial satellite but also to the general fields that execute the estimation of attitude by means of a gyro, that is any apparatuses those which use an inertia measuring apparatus. The present invention can guarantee improvement in the accuracy, and its application field will be over a wide range. For example, the present invention can be utilized for a function to prevent a video camera shake and for attitude estimation of a car navigation system and the like.

Besides, in the specification for the present invention, it should be noted that the means described therein does not always represent a physical means, and it also includes the functions of the respective means those which are realized by software. Furthermore, the means may further include such a case that the function of one means is realized by two or more physical means, or the functions of two or more means are realized by one physical means.

As described above, according to the present invention, the attitude estimation with high accuracy can be realized based upon an output from only the inertia measuring apparatus. In particular, with the present invention, the drifts which have been problematic in the conventional techniques can be eliminated.

The invention claimed is:

1. An apparatus for estimating attitude using an inertia measuring apparatus comprising:
   a Kalman filter adapted to receive a quantity of state ω(t) from the inertia measuring apparatus, input the quantity of state into a predetermined system equation and a predetermined observation equation, and execute time update processing and observation update processing with regard to the system equation and the observation equation, a processing section adapted to generate an estimated value of a time differentiation of a modified Rodrigues parameter α(t) based upon an output of the Kalman filter an integral processing section adapted to generate an estimated value of the modified Rodrigues parameter based upon an output of the processing section, a system propagation matrix generating section adapted to update an observation sensitivity matrix based upon an initial value being given beforehand and an output of the integral processing section and supply the updated output to the Kalman filter, a transformed matrix generating section adapted to generate a coordinate transformation matrix R based upon an output of the integral processing section, and an attitude estimation section adapted to carry out an attitude estimation based upon an output of the transformed matrix generating section.

2. The apparatus for estimating attitude using an inertia measuring apparatus according to claim 1 characterized in that the modified Rodrigues parameter is given according to the following equations;

$$a \equiv 4\tan\frac{\theta}{4}e = \begin{bmatrix} \alpha_x \\ \alpha_y \\ \alpha_z \end{bmatrix}$$

$$\alpha_0 \equiv 2 - \frac{a^2}{8}$$

wherein e is a directional cosine of a rotative axis and θ is a rotation angle about the rotative axis.

3. The apparatus for estimating attitude using an inertia measuring apparatus according to claim 1 characterized in that the observation equation is given by adding observation noises to an equation;

$$\omega = H\dot{\alpha}$$

when the following equation is valid $$H^{-1} = \begin{bmatrix} 4\alpha_0 + \alpha_x^2 & -4\alpha_z + \alpha_x\alpha_y & 4\alpha_y + \alpha_x\alpha_z \\ 4\alpha_z + \alpha_x\alpha_y & 4\alpha_0 + \alpha_y^2 & -4\alpha_x + \alpha_y\alpha_z \\ -4\alpha_y + \alpha_x\alpha_z & 4\alpha_x + \alpha_y\alpha_z & 4\alpha_0 + \alpha_z^2 \end{bmatrix}.$$

4. The apparatus for estimating attitude using an inertia measuring apparatus according to claim 1 characterized in that the system equation is given by adding system noises to the following equation;

$$\ddot{a}(t) = f(a(t), \dot{a}(t), t) = \begin{bmatrix} f_x \\ f_y \\ f_z \end{bmatrix}$$

when the right member of the following equation;

$$\ddot{a} = \frac{1}{8}\begin{bmatrix} (\alpha_x\dot{\alpha}_x - \alpha_y\dot{\alpha}_y - \alpha_z\dot{\alpha}_z)\omega_x + (-4\dot{\alpha}_z + \dot{\alpha}_x\alpha_y + \alpha_x\dot{\alpha}_y)\omega_y + \\ (4\dot{\alpha}_y + \dot{\alpha}_x\alpha_z + \alpha_x\dot{\alpha}_z)\omega_z \\ (4\dot{\alpha}_z + \dot{\alpha}_x\alpha_y + \alpha_x\dot{\alpha}_y)\omega_z + (-\alpha_x\dot{\alpha}_x + \alpha_y\dot{\alpha}_y - \alpha_z\dot{\alpha}_z)\omega_y + \\ (-4\dot{\alpha}_x + \dot{\alpha}_y\alpha_z + \alpha_y\dot{\alpha}_z)\omega_z \\ (-4\dot{\alpha}_y + \dot{\alpha}_x\alpha_z + \alpha_x\dot{\alpha}_z)\omega_x + (4\dot{\alpha}_x + \dot{\alpha}_y\alpha_z + \alpha_y\dot{\alpha}_z)\omega_y + \\ (-\alpha_x\dot{\alpha}_x - \alpha_y\dot{\alpha}_y - \alpha_z\dot{\alpha}_z)\omega_z \end{bmatrix}$$

is set to be f(a(t),$\dot{\alpha}$(t),t).

5. A method for estimating attitude using an inertia measuring apparatus comprising:

first step adapted to receive signals from the inertia measuring apparatus and generate a system equation and an observation equation, in which a quantity of state of the time differentiation of the modified Rodrigues parameter α(t) and the quantity of state ω(t) are the quantities of observation, second step adapted to work out an estimated value of the time differentiation of the parameter α(t) with an extended Kalman filter, third step adapted to numerically integrate the estimated value worked out in the second step and work out an estimated value of the parameter α(t), fourth step adapted to determine the transformed matrix R(t) based upon the estimated value worked out in the third step, and a step adapted to work out an estimated value of the attitude based upon the transformed matrix R(t).

6. The method for estimating attitude using an inertia measuring apparatus according to claim 5 characterized in that the modified Rodrigues parameter is given according to the following equations;

$$a \equiv 4\tan\frac{\theta}{4}e = \begin{bmatrix} \alpha_x \\ \alpha_y \\ \alpha_z \end{bmatrix}$$

$$\alpha_0 \equiv 2 - \frac{a^2}{8}$$

wherein e is a directional cosine of the rotative axis and θ is an rotation angle about the rotative axis.

7. The method for estimating attitude using an inertia measuring apparatus according to claim 5 characterized in that the observation equation is given by adding observation noises to the following equation;

$$\omega = H\dot{\alpha}$$

when the following equation is valid $$H^{-1} = \begin{bmatrix} 4\alpha_0 + \alpha_x^2 & -4\alpha_z + \alpha_x\alpha_y & 4\alpha_y + \alpha_x\alpha_z \\ 4\alpha_z + \alpha_x\alpha_y & 4\alpha_0 + \alpha_y^2 & -4\alpha_x + \alpha_y\alpha_z \\ -4\alpha_y + \alpha_x\alpha_z & 4\alpha_x + \alpha_y\alpha_z & 4\alpha_0 + \alpha_z^2 \end{bmatrix}.$$

8. The method for estimating attitude using an inertia measuring apparatus according to claim 5 characterized in that the system equation is given by adding system noises to the following equation;

$$\ddot{a}(t) = f(a(t), \dot{a}(t), t) = \begin{bmatrix} f_x \\ f_y \\ f_z \end{bmatrix}$$

when the right member of the following equation;

$$\ddot{a} = \frac{1}{8} \begin{bmatrix} (\alpha_x \dot{\alpha}_x - \alpha_y \dot{\alpha}_y - \alpha_z \dot{\alpha}_z)\omega_x + (-4\dot{\alpha}_z + \dot{\alpha}_x \alpha_y + \alpha_x \dot{\alpha}_y)\omega_y + \\ (4\dot{\alpha}_y + \dot{\alpha}_x \alpha_z + \alpha_x \dot{\alpha}_z)\omega_z \\ (4\dot{\alpha}_z + \dot{\alpha}_x \alpha_y + \alpha_x \dot{\alpha}_y)\omega_z + (-\alpha_x \dot{\alpha}_x + \alpha_y \dot{\alpha}_y - \alpha_z \dot{\alpha}_z)\omega_y + \\ (-4\dot{\alpha}_x + \dot{\alpha}_y \alpha_z + \alpha_y \dot{\alpha}_z)\omega_z \\ (-4\dot{\alpha}_y + \dot{\alpha}_x \alpha_z + \alpha_x \dot{\alpha}_z)\omega_x + (4\dot{\alpha}_x + \dot{\alpha}_y \alpha_z + \alpha_y \dot{\alpha}_z)\omega_y + \\ (-\alpha_x \dot{\alpha}_x - \alpha_y \dot{\alpha}_y - \alpha_z \dot{\alpha}_z)\omega_z \end{bmatrix}$$

is set to be f(a(t),$\dot{\alpha}$(t),t).

9. A computer readable medium for storing a program rendering a computer to implement:
- first step adapted to receive signal from the inertia measuring apparatus and generate a system equation and an observation equation, in those which the quantity of state of the time differentiation of the modified Rodrigues parameter α(t) and the quantity of state ω(t) are the quantities of observation,
- second step adapted to work out an estimated value of the time differentiation of the parameter α(t) with the extended Kalman filter,
- third step adapted to numerically integrate the estimated value worked out in the second step and work out an estimated value of the parameter α(t),
- fourth step adapted to determine the transformed matrix R(t) based upon the estimated value worked out in the third step, and
- a step adapted to work out an estimated value of the attitude based upon the transformed matrix R(t).

10. The computer readable medium according to claim 9 characterized in that the modified Rodrigues parameter is given according to the following equations;

$$a \equiv 4\tan\frac{\theta}{4}e = \begin{bmatrix} \alpha_x \\ \alpha_y \\ \alpha_z \end{bmatrix}$$

$$\alpha_0 \equiv 2 - \frac{a^2}{8}$$

wherein e is a directional cosine of the rotative axis and θ is a rotation angle about the rotative axis.

11. The computer readable medium according to claim 9 characterized in that the observation equation is given by adding observation noises to the following equation;

ω=H$\dot{\alpha}$ when the following equation is valid $$H^{-1} = \begin{bmatrix} 4\alpha_0 + \alpha_x^2 & -4\alpha_z + \alpha_x \alpha_y & 4\alpha_y + \alpha_x \alpha_z \\ 4\alpha_z + \alpha_x \alpha_y & 4\alpha_0 + \alpha_y^2 & -4\alpha_x + \alpha_y \alpha_z \\ -4\alpha_y + \alpha_x \alpha_z & 4\alpha_x + \alpha_y \alpha_z & 4\alpha_0 + \alpha_z^2 \end{bmatrix}.$$

12. The computer readable medium according to claim 9 characterized in that the system equation is given by adding system noises to the following equation;

$$\ddot{a}(t) = f(a(t), \dot{a}(t), t) = \begin{bmatrix} f_x \\ f_y \\ f_z \end{bmatrix}$$

when the right member of the following equation;

$$\ddot{a} = \frac{1}{8} \begin{bmatrix} (\alpha_x \dot{\alpha}_x - \alpha_y \dot{\alpha}_y - \alpha_z \dot{\alpha}_z)\omega_x + (-4\dot{\alpha}_z + \dot{\alpha}_x \alpha_y + \alpha_x \dot{\alpha}_y)\omega_y + (4\dot{\alpha}_y + \dot{\alpha}_x \alpha_z + \alpha_x \dot{\alpha}_z)\omega_z \\ (4\dot{\alpha}_z + \dot{\alpha}_x \alpha_y + \alpha_x \dot{\alpha}_y)\omega_z + (-\alpha_x \dot{\alpha}_x + \alpha_y \dot{\alpha}_y - \alpha_z \dot{\alpha}_z)\omega_y + (-4\dot{\alpha}_x + \dot{\alpha}_y \alpha_z + \alpha_y \dot{\alpha}_z)\omega_z \\ (-4\dot{\alpha}_y + \dot{\alpha}_x \alpha_z + \alpha_x \dot{\alpha}_z)\omega_x + (4\dot{\alpha}_x + \dot{\alpha}_y \alpha_z + \alpha_y \dot{\alpha}_z)\omega_y + (-\alpha_x \dot{\alpha}_x - \alpha_y \dot{\alpha}_y + \alpha_z \dot{\alpha}_z)\omega_z \end{bmatrix}$$

is set to be f(a(t),$\dot{\alpha}$(t),t).

\* \* \* \* \*